United States Patent [19]

Grassi et al.

[11] 4,130,589

[45] Dec. 19, 1978

[54] OXYALKYLATED ALKYL POLYAMINES AS DEFOAMING AGENTS

[75] Inventors: Guido Grassi, Basel; Hans-Peter Baumann, Ettingen; Helmut Pummer, Therwil, all of Switzerland

[73] Assignee: Sandoz Ltd., Basel, Switzerland

[21] Appl. No.: 877,579

[22] Filed: Feb. 14, 1978

Related U.S. Application Data

[63] Continuation of Ser. No. 745,307, Nov. 26, 1976, abandoned, which is a continuation-in-part of Ser. No. 637,717, Dec. 4, 1975, abandoned.

[51] Int. Cl.$^2$ ............................................. C07C 93/04
[52] U.S. Cl. ................................................. 260/584 B
[58] Field of Search ...................................... 260/584 B

[56] References Cited

U.S. PATENT DOCUMENTS

| 3,428,682 | 2/1969 | Egan et al. .................... 260/584 B X |
| 3,456,013 | 7/1969 | Egan et al. ....................... 260/584 B |
| 3,574,755 | 4/1971 | McConnell et al. ............. 260/584 B |
| 3,627,475 | 12/1971 | Baumann .............................. 8/1 A X |
| 3,729,420 | 4/1973 | Sanders et al. ............. 260/584 B X |
| 3,894,070 | 7/1975 | Tomiyama et al. .............. 260/584 B |

FOREIGN PATENT DOCUMENTS

| 247425 | 7/1960 | Australia .............................. 260/584 B |
| 2414428 | 10/1974 | Fed. Rep. of Germany. |
| 1006787 | 10/1965 | United Kingdom. |

*Primary Examiner*—Allen B. Curtis
*Attorney, Agent, or Firm*—Gerald D. Sharkin; Richard E. Vila; Joseph J. Borovian

[57] ABSTRACT

The present invention concerns novel oxalkylated alkyl polyamines in free base, acid addition salt and/or quaternary ammonium salt form useful as anti-foaming agents.

15 Claims, No Drawings

OXYALKYLATED ALKYL POLYAMINES AS DEFOAMING AGENTS

This is a continuation of application Ser. No. 745,307 filed Nov. 26, 1976, which in turn is a continuation-in-part of Ser. No. 637,717, filed Dec. 4, 1975, both now abandoned.

The present invention relates to oxalkylated alkyl polyamines in free base, acid addition salt and/or quaternary ammonium salt form possessing anti-foaming properties.

Accordingly, the present invention provides compounds of formula I

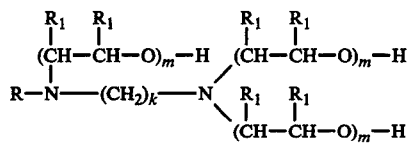

wherein
R is a $C_{10}$–$C_{30}$ alkyl or alkenyl group,
one of the $R_1$'s in each

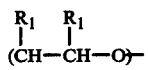

unit is hydrogen and the other is hydrogen or methyl,
k is an integer 2 to 8,
and each m is, independently, an integer 2 to 221,
each

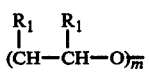

chain containing at least one ethylene-oxy group and at least one propylene-oxy group, the number of all ethylene-oxy groups in the molecule being from 5 to 35 and the number of all the propylene-oxy groups in the molecule being from 170 to 190,
in free base, acid addition salt and/or quaternary ammonium salt form.

R is preferably a $C_{12}$–$C_{24}$, more preferably a $C_{14}$–$C_{22}$ alkyl or alkenyl group. Straight chain alkyl groups are particularly preferred.

K is preferably an integer 2 to 6, and in particular 3. The

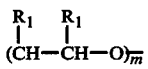

chains are preferably made up of ethylene-oxy and propylene-oxy blocks. In addition, the ethylene-oxy blocks are preferably attached directly to the amino nitrogen atoms, and the propylene-oxy blocks are attached to the ethylene-oxy blocks.

The compounds of formula I preferably contain, in toto, from 10 to 30, more preferably 13 to 25, especially 18 to 22, for example 21, ethylene-oxy groups. Independently, the compounds preferably contain, in toto, from 175 to 185, more preferably 178 to 182, especially 180, propylene-oxy groups.

The ratio of ethylene-oxy to propylene-oxy groups is preferably from 1 : 6 to 1 : 18, more preferably from 1 : 7 to 1 : 14, and particularly from 1 : 8 to 1 : 10.

The compounds of formula I are preferably in acid addition salt and/or quaternary ammonium salt form. Preferred acid addition salt forms are those derived from hydrogen halo acids, for example from hydrochloric acid. Preferred quaternary ammonium salt forms are those bearing on the quaternated nitrogen atom a $C_1$–$C_4$ alkyl group, especially methyl. The most preferred form of the compounds of formula I is the hydrogen chloride acid addition salt form.

The compounds of formula I, according to a further aspect of the present invention, are produced by oxalkylating an alkyl polyamine of formula II,

$$R-NH-(CH_2)_k-NH_2 \quad\quad II$$

wherein R and k are as defined above, with 5 to 35 mols of ethylene oxide and from 170 to 190 mols of propylene oxide per mol of the compound of formula II, and when required, converting the resulting product into acid addition salt and/or quaternary ammonium salt form.

The compounds of formula II are in general known. An example of a preferred compound of formula II is the known tallowaminopropylamine, in which the tallow radical is derived from a tallow fatty acid mixture, i.e. a mixture of myristic, palmitic, stearic, oleic and linoleic acids.

As mentioned above, the preferred compounds of formula I are those wherein ethylene-oxy blocks are attached directly to the nitrogen atoms and the propylene-oxy blocks attached to the ethylene-oxy blocks. In order to produce these compounds, a compound of formula II is reacted first, with ethylene oxide, and then with propylene oxide.

The oxalkylation of the compounds of formula II is carried out in known manner, e.g. at a temperature of 160°–170° C. at atmospheric pressure, or 110°–140° C. under a pressure of from 2 to 20 atmospheres. The reaction is preferably effected in the presence of polyoxalkylating catalysts, such as alkalis or alkali metal alcoholates in an amount from 0.05 to 5% of the weight of the compound of formula II.

Acid addition salt and quaternary ammonium salt forms may be prepared from the free base forms in manner known per se by treatment of the free base form with an acid, i.e. hydrochloric acid, or with a quaternating agent, such as an alkylating agent, e.g. an alkyl halide or an alkyl sulphate, respectively.

The compounds of formula I are useful as defoaming agents. Thus they may be employed for the inhibition or elimination of foam in an aqueous foamable or foamed medium, respectively, by a method comprising treating said medium with an effective amount of a compound of formula I. Said method also forms part of the present invention.

The amount of compound employed will naturally vary depending on, for example, the foamability of the medium to be treated or the amount of foam formed. However, in general satisfactory results may be obtained when employed in the range 0.002 to 30%, preferably 0.005 to 20%, by weight of the system to be treated.

For such use, the compounds are preferably applied in the form of an aqueous dispersion, especially in the treatment of foamed media. Such aqueous dispersions conveniently contain from 1 to 10% by weight of the compound. In the treatment of foamed media, the aqueous dispersion is preferably sprayed over the foam.

The defoaming agents of the present invention find particular application in the paper industry, e.g. in inhibiting or removing undesirable foam in the production and processing of paper stock suspensions and in the surface treatment of formed paper, in the dye industry, e.g. in the prevention of foaming in dye baths, or in environmental control, e.g. in the elimination of foam in effluent waste.

The compounds are particularly preferred for use in the production and processing of paper stock suspensions and in the surface treatment of formed paper. In this respect they have the advantages of being effective over a large range of concentrations, of possessing a long-lasting action and notable stability in aqueous dispersion and of being easily applied.

For use in the paper industry, amounts in the range of 0.002 to 2%, especially 0.005 to 0.6%, based on the weight of solid matter being treated are preferably employed.

For use in the dyeing industry (including printing), amounts in the range 4 to 20% especially 8 to 15%, based on the weight of the liquid dyeing or printing preparation are preferably employed.

In the following Examples, the parts and percentages are by weight and the temperatures are in degrees Centigrade.

EXAMPLE 1

184 Parts of gaseous ethylene oxide are introduced with the addition of 1 part sodium hydroxide into 72 parts of tallowaminopropylamine. A further 1 part of sodium hydroxide is then added, followed by the addition, dropwise, at 160°–170° of 2091 parts of propylene oxide. The addition product is cooled to 20° and brought to a pH of 6 by the addition of approximately 10 parts of 36% hydrochloric acid. The resulting product is in mono-hydrochloride form.

EXAMPLE 2

In analogous manner to that described in Example 1, a di-hydrochloride form of a compound of formula I is produced employing 57 parts of N-decyloctamethylene diamine, 90 parts of ethylene oxide, 2030 parts of propylene oxide and 45 parts of 36% hydrochloric acid.

EXAMPLE 3

In analogous manner to that described in Example 1, a free base form of a compound of formula I is produced employing 52 parts of N-triacontyl-pentamethylene diamine, 1073 parts of propylene oxide, 132 parts of ethylene oxide and 4 parts of 36% hydrochloric acid.

EXAMPLE 4

In analogous manner to that described in Example 1, a bi-quaternated compound of formula I is produced employing 31 parts of N-myristyl-hexamethylene diamine, 110 parts of ethylene oxide and 986 parts of propylene oxide and alkylating the resulting product with 25 parts of dimethylsulfate.

The alkyleneoxy content and more particularly the number of ethyleneoxy and propyleneoxy groups per molecule of the compounds produced in accordance with Examples 1 to 4 above are set out below in the following table, in which the symbols "R", "k" and "m" are those given in formula I above. In general, any molecule will tend to have the same or almost the same number of ethyleneoxy groups in each of the three

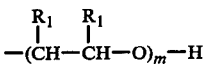

chains and, independently, the same or almost the same number of propyleneoxy groups in each of said chains.

TABLE

| | R | k | Total value of the 3 m's per molecule | No. of ethyleneoxy groups per molecule | No. of propyleneoxy groups per molecule |
|---|---|---|---|---|---|
| 1) | Tallowalkyl | 3 | 201 | 21 | 180 |
| 2) | Decyl | 8 | 185 | 10 | 175 |
| 3) | Triacontyl | 5 | 215 | 30 | 185 |
| 4) | Myristyl | 6 | 195 | 25 | 170 |

Application Example A

A paper coating mass for air brush coating is produced as follows:

60 Parts water, 0.8 parts dispersing agent (based on a polyacrylate), 0.5 parts sodium hydroxide and 120 parts kaolin are dispersed in a disperser with high shearing stress. To this kaolin dispersion, 160 parts 15% lactic acid casein, produced as follows, are added: 24 parts lactic acid casein are dissolved at 57.5° ± 2.5° in 133.6 parts water with the addition of 2.4 parts soda. 160 Parts satin white are then added slowly to the kaolin dispersion, followed by 32 parts of a carboxylated styrene/butadiene binder.

After the production of the paper coating mass, 0.1% of the compound produced in accordance with Example 1, based on the solid matter in the coating mass, is added thereto as antifoaming agent. The foaming tendency of the coating mass is much diminished.

Application Example B

A paper coating mass is produced as follows:

50 Parts water, 0.2 parts sodium tripolyphosphate, 0.1 parts dispersing agent (based on polyacrylate), 0.1 parts sodium hydroxide and 100 parts kaolin are dispersed in a disperser with high shearing stress. After this, 17 parts water, 50 parts 10% lactic acid casein and 20 parts carboxylated styrene/butadiene binder are gradually added. 50 Parts of a 10% lactic acid casein are produced by dissolving 5 parts lactic acid casein in 44.5 parts water with the addition of 0.5 parts soda.

After the production of the paper coating mass, 0.05% of the compound of Example 1, based on the weight of solid matter in the coating mass, is sprayed as an aqueous dispersion over the foam formed on the coating mass. The majority of the foam is eliminated.

Application Example C

A 0.5% aqueous stock suspension containing a perfluorinated hydrocarbon used to produce oil-repellent paper has the following composition:

70 Parts wood pulp, 30 parts sulphite cellulose, 3 parts of the perfluorinated hydrocarbon, 3 parts complexing agent (Komplexon - Trade Mark), 2 parts of a retention agent (polyamide amine). When 0.5% by weight of the defoamer produced in Example 1, based on the solid matter in the stock, is added, the foaming tendency is reduced.

Application Example D 90 g of a liquid dye preparation comprising 13.75 parts of a disperse dyestuff of the formula

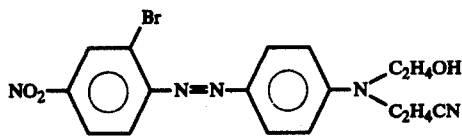

0.11 parts of para-chloro-meta-cresol, 11.07 parts of a dispersion agent of the disulpho-dinaphthylmethane type of the formula

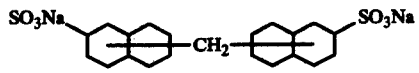

0.22 parts of phosphoric acid, 2.79 parts of lignin sulphonate, 10.00 parts of a dispersing agent of the formula

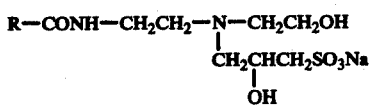

wherein R—CO is the acyl group of a coconut fatty acid mixture, and 62.06 parts of water are mixed with 10 g of a mixture comprising 87.5 parts of a sulphonated ricinus oil having a level of sulphonation of 80% and 12.5 parts of the compound of Example 1. The resulting dye bath is characterised by its low tendency to foam in the dyeing of textile pieces, e.g. curtains, of polyester and polyamine.

What we claim is:

1. A compound of the formula

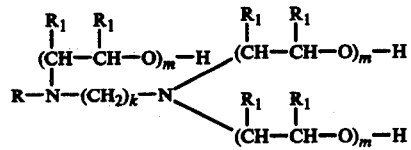

wherein
R is a $C_{10}$–$C_{30}$ alkyl or alkenyl group,
one of the $R_1$'s in each

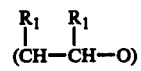

unit is hydrogen and the other is hydrogen or methyl,
k is an integer 2 to 8,
and each m is, independently, an integer 2 to 221, each

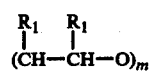

chain consists of a polyethylene-oxy block and a polypropylene-oxy block, wherein the polyethylene-oxy blocks are attached directly to the amino nitrogen atoms, the number of all ethylene-oxy groups per molecule of the compound being from 5 to 35 and the number of all the propylene-oxy groups per molecule of the compound being from 170 to 190,
which compound is in free base, acid addition salt and/or quaternary ammonium salt form.

2. A compound according to claim 1, wherein R is a $C_{12}$–$C_{24}$ alkyl or alkenyl group.
3. A compound according to claim 2, wherein R is a $C_{14}$–$C_{22}$ alkyl or alkenyl group.
4. A compound according to claim 1, wherein R is a straight chain alkyl group.
5. A compound according to claim 1, wherein k is 2 to 6.
6. A compound according to claim 5, wherein k is 3.
7. A compound according to claim 1, containing from 10 to 30 ethylene-oxy groups per molecule of the compound.
8. A compound according to claim 7, containing from 13 to 25 ethylene-oxy groups per molecule of the compound.
9. A compound according to claim 8, containing from 18 to 22 ethylene-oxy groups per molecule of the compound.
10. A compound according to claim 1, containing from 175 to 185 propylene-oxy groups per molecule of the compound.
11. A compound according to claim 10, containing from 178 to 182 propylene-oxy groups per molecule of the compound.
12. A compound according to claim 1, wherein the ratio of ethylene-oxy to propylene-oxy groups per molecule of the compound is from 1 : 6 to 1 : 18.
13. A compound according to claim 12, wherein said ratio is from 1 : 7 to 1 : 14.
14. A compound according to claim 13, wherein said ratio is from 1 : 8 to 1 : 10.
15. A compound according to claim 1 in hydrochloride form.

* * * * *

UNITED STATES PATENT AND TRADEMARK OFFICE
CERTIFICATE OF CORRECTION

PATENT NO. : 4,130,589
DATED : December 19, 1978
INVENTOR(S) : Guido Grassi/Hans-Peter Baumann/Helmut Pummer It is certified that error appears in the above-identified patent and that said Letters Patent are hereby corrected as shown below:

First page, please insert

--     Foreign Application Priority Data

December 11, 1974    [CH]    Switzerland    16462/74 --.

Signed and Sealed this

Nineteenth Day of February 1980

[SEAL]

*Attest:*

SIDNEY A. DIAMOND

*Attesting Officer*      *Commissioner of Patents and Trademarks*